(12) United States Patent
Song et al.

(10) Patent No.: US 8,606,312 B2
(45) Date of Patent: Dec. 10, 2013

(54) METHOD FOR CONTROLLING TRANSMISSION POWER IN CELLULAR SYSTEM

(75) Inventors: Young Seog Song, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 404 days.

(21) Appl. No.: 12/868,144

(22) Filed: Aug. 25, 2010

(65) Prior Publication Data

US 2011/0143806 A1    Jun. 16, 2011

(30) Foreign Application Priority Data

Dec. 15, 2009  (KR) .................. 10-2009-0124876

(51) Int. Cl.
*H04B 7/00*  (2006.01)

(52) U.S. Cl.
USPC ............................................ 455/522; 455/69

(58) Field of Classification Search
USPC ........................................................ 455/522
See application file for complete search history.

(56) References Cited

U.S. PATENT DOCUMENTS

| | | | |
|---|---|---|---|
| 5,432,842 A * | 7/1995 | Kinoshita et al. ............. | 455/440 |
| 7,054,664 B2 * | 5/2006 | Nagaraj ...................... | 455/562.1 |
| 7,197,013 B2 * | 3/2007 | Douglas et al. ............... | 370/252 |
| 7,333,835 B2 * | 2/2008 | Nagaraj ...................... | 455/562.1 |
| 7,783,296 B2 * | 8/2010 | Kaplan et al. ............. | 455/456.1 |
| 7,925,295 B2 * | 4/2011 | Yanover et al. ............ | 455/552.1 |
| 8,009,581 B2 * | 8/2011 | Frenger et al. ................ | 370/252 |
| 8,041,469 B2 * | 10/2011 | Kellum et al. ............... | 700/300 |
| 8,045,996 B2 * | 10/2011 | Brunner et al. ............ | 455/456.1 |
| 8,135,429 B2 * | 3/2012 | Kuroda et al. ............... | 455/522 |
| 8,155,688 B2 * | 4/2012 | Kim et al. ..................... | 455/522 |
| 8,219,105 B2 * | 7/2012 | Kronestedt et al. .......... | 455/450 |
| 8,224,372 B2 * | 7/2012 | Pedersen et al. ............. | 455/522 |
| 8,233,844 B2 * | 7/2012 | Shan et al. .................... | 455/63.1 |
| 8,266,487 B2 * | 9/2012 | Chen et al. .................... | 714/746 |
| 8,280,387 B2 * | 10/2012 | Guvenc et al. ............... | 455/449 |
| 8,280,412 B2 * | 10/2012 | Rudolf et al. ............. | 455/456.5 |
| 8,359,059 B2 * | 1/2013 | Kim et al. ..................... | 455/522 |
| 8,446,881 B2 * | 5/2013 | Naka et al. .................... | 370/335 |
| 8,472,412 B2 * | 6/2013 | Naka et al. .................... | 370/335 |
| 8,509,704 B1 * | 8/2013 | Vargantwar .................... | 455/69 |
| 2002/0077142 A1 | 6/2002 | Sato et al. | |
| 2003/0069010 A1 * | 4/2003 | Eravelli ........................ | 455/423 |
| 2003/0087648 A1 * | 5/2003 | Mezhvinsky et al. ......... | 455/456 |
| 2003/0171132 A1 * | 9/2003 | Ho et al. ....................... | 455/522 |
| 2005/0190732 A1 * | 9/2005 | Douglas et al. ............... | 370/338 |
| 2005/0285792 A1 * | 12/2005 | Sugar et al. ................... | 342/465 |
| 2006/0019694 A1 * | 1/2006 | Sutivong et al. ............. | 455/522 |

(Continued)

FOREIGN PATENT DOCUMENTS

| EP | 2257111 A1 * | 12/2010 | ............ H04W 52/24 |
|---|---|---|---|
| KR | 10-2002-0025733 | 4/2002 | |

(Continued)

*Primary Examiner* — Hai V Nguyen
(74) *Attorney, Agent, or Firm* — Staas & Halsey LLP

(57) ABSTRACT

A method for controlling transmission power of a base station in a cellular system includes: receiving a reference signal from at least one neighbor base station that is located around the base station; estimating a radio environment between the base station and the neighbor base station by using the receiving power of the reference signal; and controlling cell coverage of the base station by determining the transmission power based on the radio environment.

9 Claims, 11 Drawing Sheets

(56) References Cited

U.S. PATENT DOCUMENTS

| | | |
|---|---|---|
| 2006/0072530 A1* | 4/2006 | Strutt et al. .................. 370/338 |
| 2006/0083206 A1 | 4/2006 | Min |
| 2006/0135134 A1* | 6/2006 | Mezhvinsky et al. ...... 455/414.1 |
| 2006/0149475 A1* | 7/2006 | Kellum et al. ................. 701/300 |
| 2006/0203894 A1* | 9/2006 | Ventola .......................... 375/148 |
| 2006/0274676 A1* | 12/2006 | Niu et al. ....................... 370/255 |
| 2007/0129111 A1* | 6/2007 | Kim et al. .................... 455/562.1 |
| 2007/0280096 A1* | 12/2007 | Yanover et al. ............... 370/201 |
| 2007/0293260 A1* | 12/2007 | Xiao et al. .................... 455/522 |
| 2008/0057996 A1* | 3/2008 | Sung et al. .................... 455/522 |
| 2008/0096566 A1* | 4/2008 | Brunner et al. ............... 455/437 |
| 2008/0130582 A1* | 6/2008 | Lee et al. ...................... 370/332 |
| 2008/0171565 A1* | 7/2008 | Shan et al. ..................... 455/501 |
| 2008/0268844 A1* | 10/2008 | Ma et al. ....................... 455/436 |
| 2009/0005030 A1* | 1/2009 | Han et al. ...................... 455/423 |
| 2009/0005102 A1* | 1/2009 | Das et al. ...................... 455/522 |
| 2009/0023466 A1* | 1/2009 | Sutivong et al. .............. 455/522 |
| 2009/0042593 A1* | 2/2009 | Yavuz et al. .................. 455/522 |
| 2009/0042594 A1* | 2/2009 | Yavuz et al. .................. 455/522 |
| 2009/0042595 A1* | 2/2009 | Yavuz et al. .................. 455/522 |
| 2009/0042596 A1* | 2/2009 | Yavuz et al. .................. 455/522 |
| 2009/0080372 A1* | 3/2009 | Naka et al. .................... 370/328 |
| 2009/0196193 A1* | 8/2009 | Frenger et al. ................ 370/252 |
| 2009/0254789 A1* | 10/2009 | Chen et al. .................... 714/746 |
| 2009/0312047 A1* | 12/2009 | Satou et al. ................... 455/522 |
| 2009/0318181 A1* | 12/2009 | Tao et al. ...................... 455/522 |
| 2010/0081442 A1* | 4/2010 | Kronestedt et al. ........... 455/450 |
| 2010/0208685 A1* | 8/2010 | Kim et al. ..................... 370/329 |
| 2010/0265862 A1* | 10/2010 | Choi et al. ..................... 370/311 |
| 2011/0117953 A1* | 5/2011 | Kim et al. ..................... 455/522 |
| 2011/0136493 A1* | 6/2011 | Dimpflmaier et al. ........ 455/450 |
| 2011/0170509 A1* | 7/2011 | Naka et al. .................... 370/329 |
| 2011/0255514 A1* | 10/2011 | Olofsson et al. .............. 370/331 |
| 2012/0014274 A1* | 1/2012 | Muraoka et al. .............. 370/252 |
| 2012/0172041 A1* | 7/2012 | Krishnamurthy et al. .... 455/436 |
| 2012/0314806 A1* | 12/2012 | Kang et al. .................... 375/296 |

FOREIGN PATENT DOCUMENTS

| | | |
|---|---|---|
| KR | 10-2006-0034461 | 4/2006 |
| KR | 10-2009-0046686 | 5/2009 |
| KR | 10-2009-0093197 | 9/2009 |
| WO | 2009/061106 | 5/2009 |

* cited by examiner

METHOD FOR CONTROLLING TRANSMISSION POWER IN CELLULAR SYSTEM

CROSS-REFERENCE TO RELATED APPLICATION

This application claims priority to and the benefit of Korean Patent Application No. 10-2009-0124876 filed in the Korean Intellectual Property Office on Dec. 15, 2009, the entire contents of which are incorporated herein by reference.

BACKGROUND OF THE INVENTION (a) Field of the Invention

The present invention relates to a method for controlling transmission power in a cellular system.

(b) Description of the Related Art

A cellular system has a cell structure to efficiently configure a system. FIG. 1 is an exemplified diagram showing a cellular system.

Referring to FIG. 1, in a cellular system, a cell 1 is surrounded by a plurality of cells (Cell 2, Cell 3, Cell 4, Cell 5, Cell 6, and Cell 7). One cell includes a base station (BS) and at least one set of user equipment (UE). In a downlink, a transmitter may be a part of the base station and a receiver may be a part of the user equipment. In an uplink, the transmitter may be a part of the user equipment and the receiver may be a part of the base station.

The cell is an area where one base station provides communication services. A multi-cell may be formed by disposing the base station having at least one cell in plural. The base station that provides the communication services to the user equipment may be referred to a serving base station (Serving BS), and a base station located around the serving base station may be referred to a neighbor base station (Neighbor BS). The cell of the serving base station is referred to as a serving cell, and the cell of the neighbor base station is referred to as a neighbor cell.

In a general cellular system, a plurality of base stations are uniformly disposed and each cell coverage is divided in a hexagonal comb shape. Offline work to dispose the plurality of base stations is performed in consideration of the maximum transmission power of the base station, the user density, the topography, and the maximum capacity of the base station. Any user equipment measures receiving power from the plurality of base stations by using a reference signal, and is connected to the base station having the strongest receiving power. The reference signal is a primary common pilot channel (P-CPICH) signal in, for example, a $3^{rd}$ generation partnership project (3GPP) system or a preamble signal in a worldwide interoperability for microwave access (WIMAX) system. Each base station transmits the reference signal, including an indicator. The user equipment detects the reference signal to find the base station, and compares the receiving power from the plurality of base stations to select the base station to be connected.

Meanwhile, unlike the general cellular system, a field requiring a system operation that can non-uniformly dispose a plurality of base stations or change the position of the base station has emerged. An example thereof may include a base station (hereinafter referred to as a military base station) in a military tactics communication system. One military base station may be disposed for each troop. Each troop is disposed in a tactical area, and the military base station in charge of each troop may be located in the campsite of the troop. In addition, the position of the military base station may be changed according to the movement of the troop. Therefore, it may be difficult for the military base station to have a uniform disposition like the general cellular system. A wireless mesh network is formed between the military base stations. In addition, the military base station generally includes a global positioning system (GPS) using a satellite to obtain position and time information according to the characteristics of the military system that requires precision measurements.

FIG. 2 is an exemplified diagram showing a cellular system in which a plurality of base stations are non-uniformly disposed.

Referring to FIG. 2, the position of the base station is represented by a dot and a cell coverage is represented by a circle when each base station transmits at the same transmission power. Many areas where coverage is overlapped between the neighbor base stations are generated due to the non-uniform disposition of the base station. In addition, many outage areas are generated between cells. Therefore, the inter-cell interference and path loss according to a distance between the base station and the user equipment may be large. The data rate and the transmission speed can be deteriorate due to the inter-cell interference and the path loss.

Therefore, in the cellular system where the plurality of base stations can be non-uniformly disposed with respect to each other or the position of the base station can be changed, a need exists for a technology that can variably operate the cell coverage.

The above information disclosed in this Background period is only for enhancement of understanding of the background of the invention and therefore it may contain information that does not form the prior art that is already known in this country to a person of ordinary skill in the art.

SUMMARY OF THE INVENTION

The present invention has been made in an effort to provide a technology of variably operating a cell coverage in a cellular system where a plurality of base stations can be non-uniformly disposed with respect to each other or the position of the base station can be changed.

An exemplary embodiment of the present invention provides a method for controlling transmission power of a base station in a cellular system, including: receiving a reference signal from at least one neighbor base station that is located around the base station; estimating a radio environment between the base station and the neighbor base station by using the receiving power of the reference signal; and controlling a cell coverage of the base station by determining the transmission power based on the radio environment.

Another exemplary embodiment of the present invention provides a method for controlling transmission power of a plurality of base station in a control station of a cellular system, including: receiving a position of each base station from the plurality of base stations; determining transmission power of each base station in consideration of the position of each base station in order to control each cell coverage; and informing each base station of the control information on the transmission power.

Yet another exemplary embodiment of the present invention provides: a reference signal receiver that receives a reference signal from a neighbor base station; a transmission power calculator that calculates transmission power by using the received reference signal; and a power controller that transmits the reference signal to the neighbor base station at a predetermined power and transmits a signal to an user equipment in a cell based on the transmission power calculated in the transmission power calculator.

According to the exemplary embodiment of the present invention, the cell coverage in the cellular system where the plurality of base stations can be non-uniformly disposed with respect to each other or the position of the base station can be changed can be variably operated, thereby making it possible to reduce the inter-cell interference and the path loss. In addition, the deterioration of the data rate and the transmission speed due to the inter-cell interference and the path loss can be prevented.

DETAILED DESCRIPTION OF THE EMBODIMENTS

Figure 1:
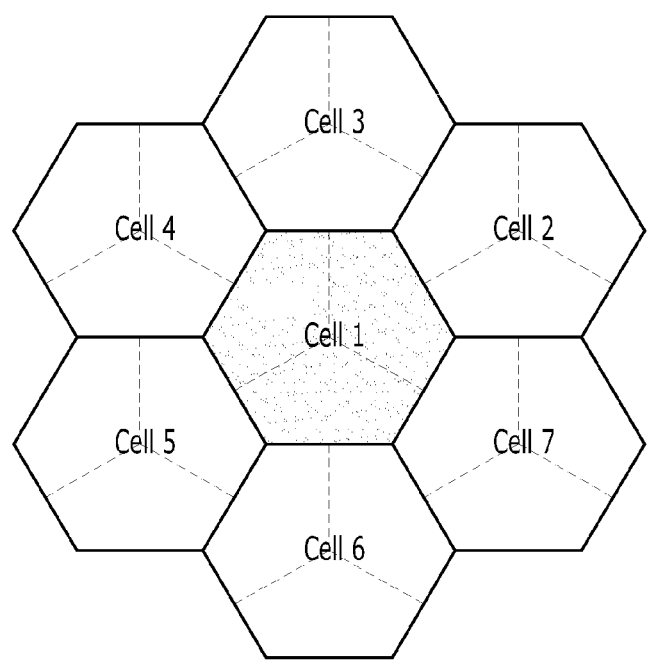
FIG. 1 is an exemplified diagram showing a cellular system.
Figure 2:
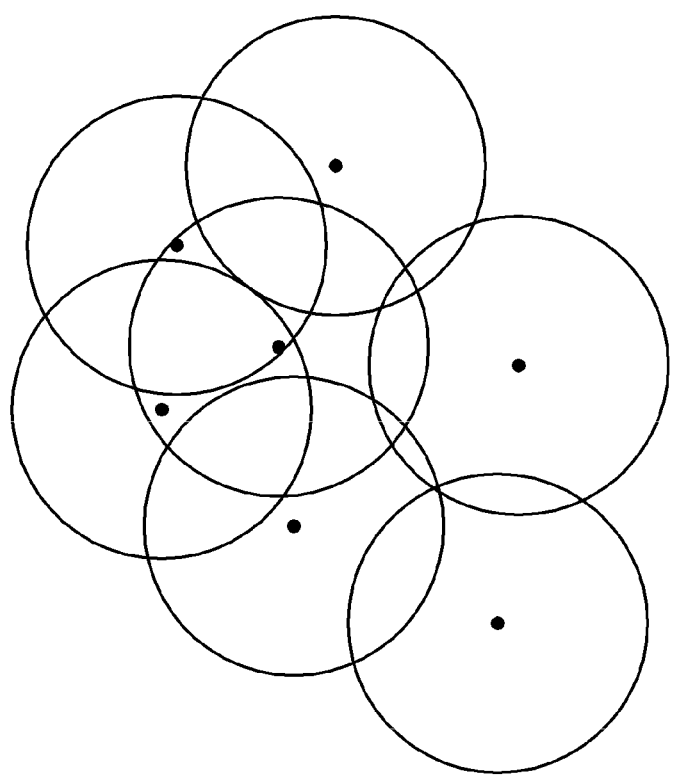
FIG. 2 is an exemplified diagram showing a cellular system in which a plurality of base stations are non-uniformly disposed.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal can be fixed or moved, and may designate a mobile station (MS), a mobile terminal (MT), a subscriber station (SS), a portable subscriber station (PSS), user equipment (UE), an access terminal (AT), etc., and may include the entire or partial functions of the mobile station, the mobile terminal, the subscriber station, the portable subscriber station, the user equipment, the access terminal, etc.

A base station (BS) may designate an access point (AP), a radio access station (RAS), a node B, an evolved node-B (eNodeB), a transmitting/receiving base station (BTS), a mobile multihop relay (MMR)-BS, etc., and may include the entire or partial functions of the access point, the radio access station, the nodeB, the eNodeB, the transmitting/receiving base station, the MMR-BS, etc.

Figure 3:
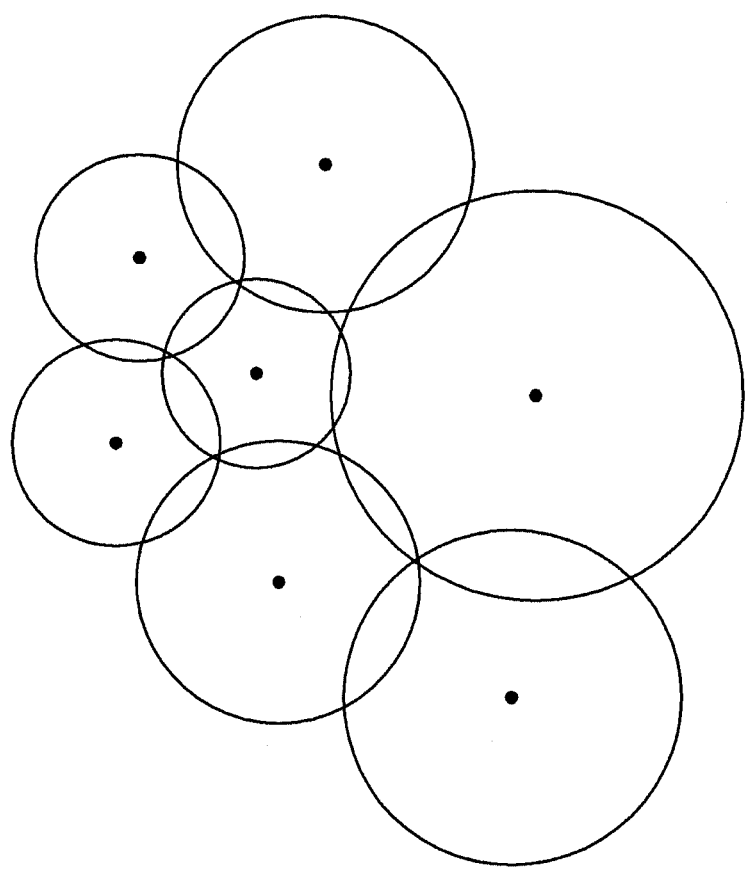
FIG. 3 is a diagram showing a cellular system that controls cell coverage according to an exemplary embodiment of the present invention.

FIG. 3 is a diagram showing a cellular system that controls cell coverage according to an exemplary embodiment of the present invention.

Referring to FIG. 3, a plurality of base stations, which are represented by a dot, are non-uniformly disposed with respect to each other, and the overlapping area and the outage area of the cell coverage is minimized. For this purpose, the transmission power control can be considered. When each base station uses different power transmission to perform downlink transmission, cell coverage of different sizes may be formed. Therefore, when each base station uses transmission power of an appropriate magnitude to perform the downlink transmission, the overlapped area and the outage area of the cell coverage can be minimized.

Hereinafter, a method for controlling transmission power to control the cell coverage in the base station will be described.

Figure 4:
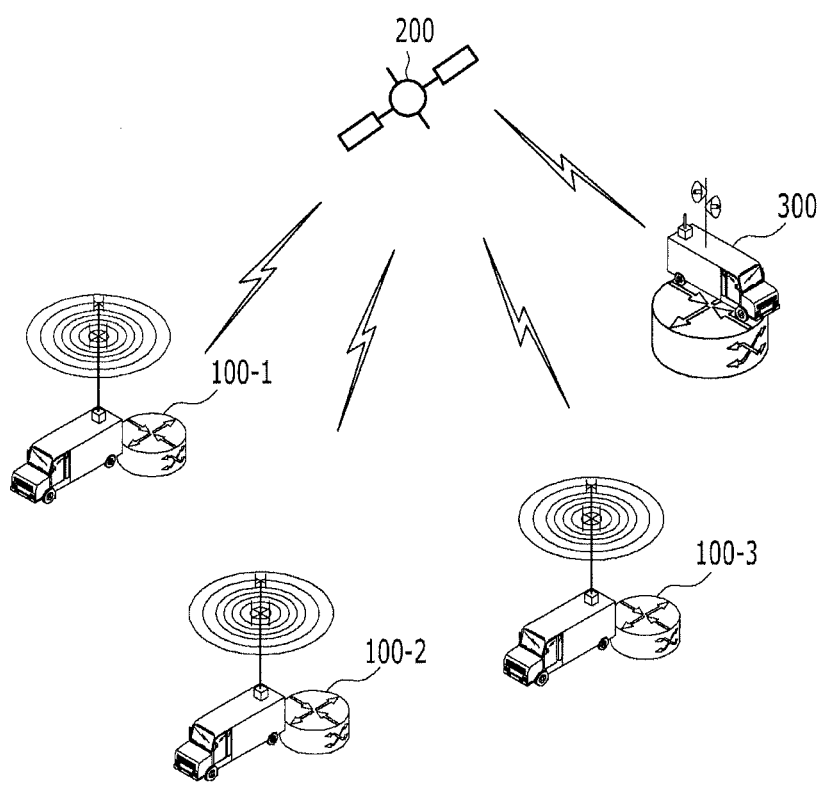
FIG. 4 is a diagram showing a cellular system according to an exemplary embodiment of the present invention.

FIG. 4 is a diagram showing a cellular system according to an exemplary embodiment of the present invention.

Referring to FIG. 4, the cellular system includes plurality of base stations 100-1, 100-2, and 100-3, a control station 300, and a satellite 200 that connects the plurality of base stations 100-1, 100-2, and 100-3 to the control station 300 by satellite communication.

The position of each of the base stations 100-1, 100-2, and 100-3 is measured and the measured position is transmitted to the satellite 200. The satellite 200 informs the control station 300 of the position of the base stations. The control station 300 determines the transmission power of the base stations 100-1, 100-2, and 100-3 in consideration of the position of the base station transmitted from the satellite 200. The control station 300 transmits the control information on the determined transmission power to each base station 100-1, 100-2, and 100-3. The control information on the transmission power may include the magnitude of the transmission power. Each base station 100-1, 100-2, and 100-3 performs the downlink transmission to the user equipment based on the transmission power control information received from the control station 300.

Although FIG. 4 shows a cellular system using the satellite communication 200, a cellular system of other schemes can be used. For example, when the control station 300 is connected to the base station 100-1, 100-2, and 100-3 by wireless or wire or when the plurality of base stations 100-1, 100-2, 100-3 are connected to a mesh network, a central control scheme using one base station as the control station 300 can be used.

Figure 5:
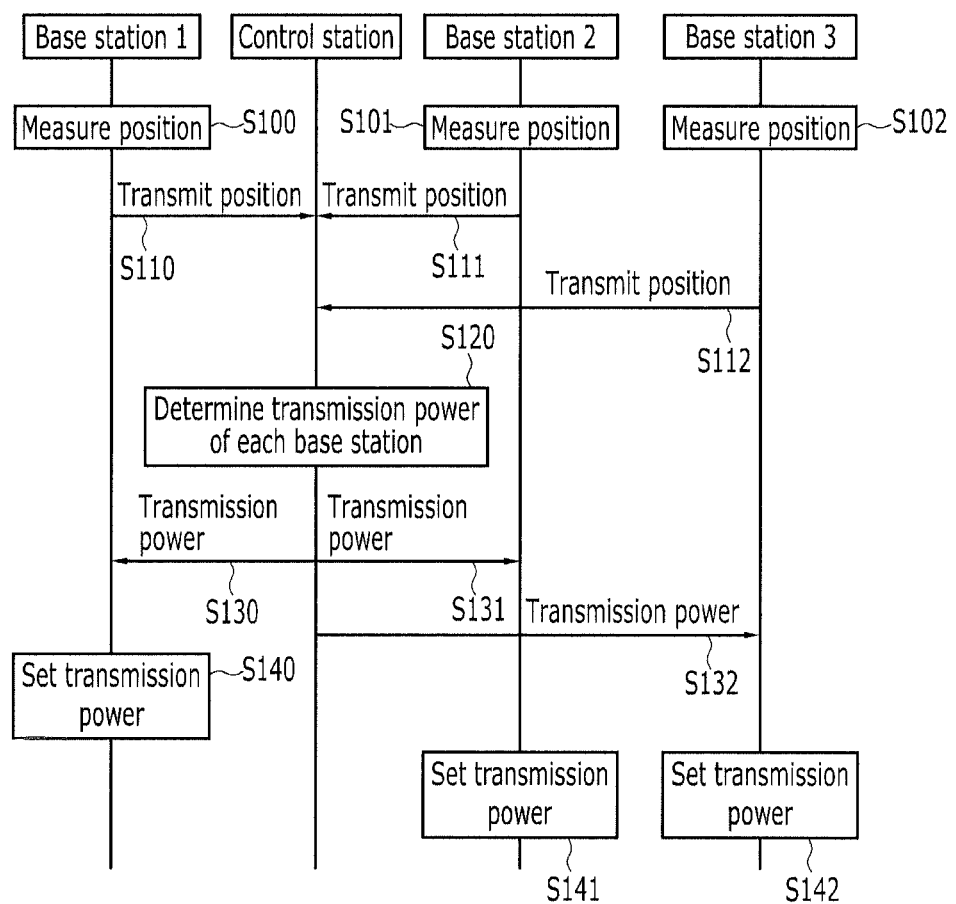
FIG. 5 is a flowchart showing a method for controlling transmission power by the central control scheme according to the exemplary embodiment of the present invention.

FIG. 5 is a flowchart showing a method for controlling transmission power by the central control scheme according to the exemplary embodiment of the present invention.

Referring to FIG. 5, the position of each base station 100-1, 100-2, and 100-3 is measured (S100, S101, and S102), and the measured position is transmitted to the control station 300 (S110, S111, and S112).

The control station 300 determines the transmission power of each base station in consideration of the position of the received base stations 100-1, 100-2, and 100-3 (S120). For example, when all the base stations 100-1, 100-2, and 100-3 are densely positioned, the control station 300 can be set to lower the transmission power of all the base stations 100-1, 100-2, and 100-3. As another example, when the base stations 100-1, 100-2, and 100-3 are located further away from each other, the control station 300 can be set to increase the transmission power of all the base stations 100-1, 100-2, and 100-3. As another example, when some base stations 100-1 and 100-2 are densely located and a remaining base station 100-3 is located further away from the base stations 100-1 and 100-2, the control station 300 relatively lowers the transmission power of base stations 100-1 and 100-2 and relatively increases the transmission power of the remaining base station 100-3.

The control station 300 can consider the position of each of the base stations 100-1, 100-2, and 100-3 as well as the channel state in order to determine the transmission power of each base station 100-1, 100-2, and 100-3 at step S120. The channel state may be represented by at least one of information such as a signal to noise ratio (SNR), a signal to interference and noise ratio (SINR), a channel quality indicator (CQI), a quality of service (QoS), etc.

The control station 300 transmits the control information on the transmission power of each base station 100-1, 100-2, and 100-3 to each of the base stations 100-1, 100-2, and 100-3 (S130, S131, and S132). Each base station 100-1, 100-2, and 100-3 sets its own transmission power based on the transmission power control information received from the control station 300 (S140, S141, and S142).

The transmission power control process of FIG. 5 can be periodically or aperiodically repeated according to a position change of the base station. Further, the transmission power control may be persistent, semi-persistent, or event-triggered.

As described above, according to the power control method in the central control scheme, the base station determines the transmission power (i.e., cell coverage) based on the transmission power control information that is provided from the control station such that when the base station is newly installed and starts operation or the base station is moved at a low speed, the overlap of the cell coverage and the occurrence of the outage can be minimized.

The transmission power cannot be controlled by the central control scheme, but each base station can determined the transmission power. This transmission power control scheme is referred to as a distributed control scheme. The case that cannot control the transmission power by the central control scheme may include, for example, a case where the base station does not have a location estimating apparatus, a case where the base station is moved at a high speed, a case where the base station does not have a satellite communication apparatus, a case where the base station is not connected by a mesh network, etc. Hereinafter, the distributed control scheme will be described in detail with reference to FIGS. 6 to 11.

Figure 6:
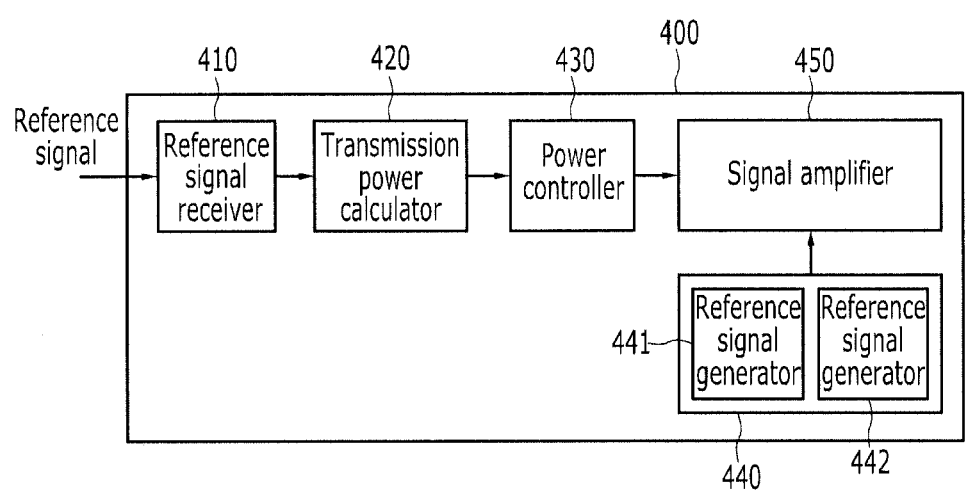
FIG. 6 is a schematic block diagram of a base station according to another exemplary embodiment of the present invention.
Figure 7:
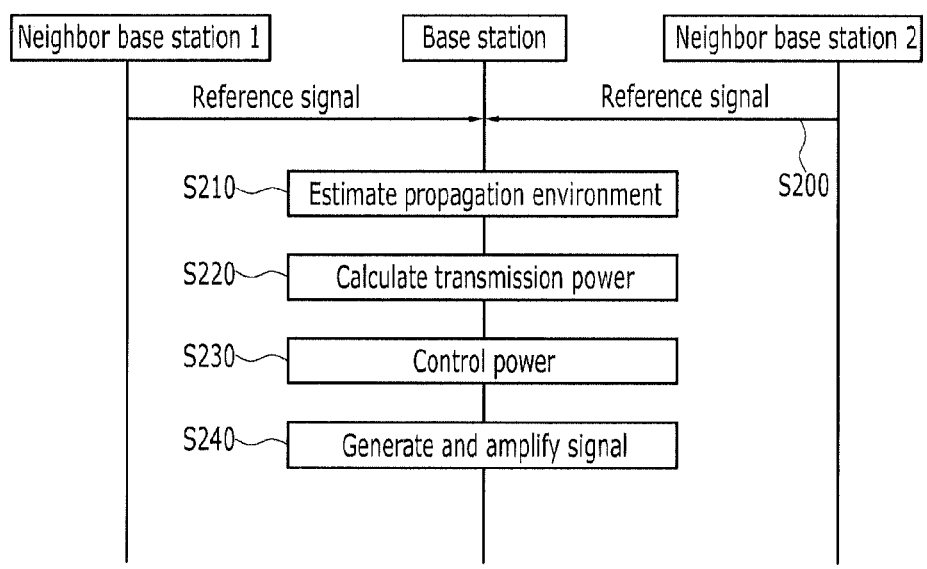
FIG. 7 is a flowchart showing a method for controlling transmission power by a distributed control scheme according to an exemplary embodiment of the present invention.
Figure 8:
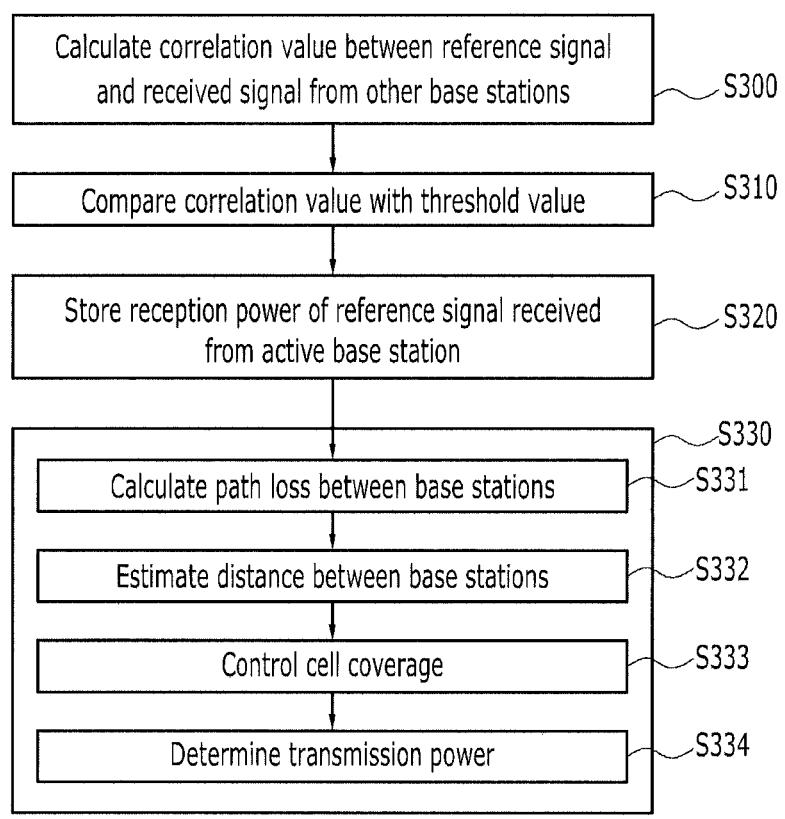
FIG. 8 is a flowchart showing a method for calculating transmission power using a reference signal received by a neighbor base station according to an exemplary embodiment of the present invention.

FIG. 6 is a schematic block diagram of a base station according to another exemplary embodiment of the present invention, and FIG. 7 is a flowchart showing a method for controlling transmission power by a distributed control scheme according to an exemplary embodiment of the present invention. FIG. 8 is a flowchart showing a method for calculating transmission power using a reference signal received by a neighbor base station according to an exemplary embodiment of the present invention.

Referring to FIG. 6, a base station 400 includes a reference signal receiver 410, a transmission power calculator 420, a power controller 430, a signal generator 440, and a signal amplifier 450.

Referring to FIGS. 6 and 7, a reference signal receiver 410 receives a reference signal (RS) from a neighbor base station (S200). The reference signal is a signal that is used for estimating the channel, and is a signal that is known by both a transmitting side and a receiving side. The reference signal can be transmitted through a primary common pilot channel or a preamble. The base station 400 transmits a reference signal to a neighbor base station. The reference signal receiver 410 can directly receive the reference signal from the neighbor base station or can receive the reference signal via the base station 400 and the receiving apparatus that is connected by wire or wirelessly. The receiving apparatus that is connected to the base station may be a general terminal that is used in the cellular system or a receiving only terminal.

The base station 400 and the neighbor base station transmit the reference signal at a predetermined same power. The plurality of base stations can transmit the reference signal through different radio resources. Herein, the radio resource may be at least one of a time resource, a frequency resource, and a code resource. In addition, an indicator can be allocated to the reference signal to differentiate the base station that transmits the reference signal, and the indicator may be generated for each base station cell by using the cell indicator.

Referring back to FIGS. 6 and 7, the transmission power calculator 420 estimates the radio environment of the base station 400 by using the received reference signal (S210). The radio environment may be the position of the base stations, the distance between the base stations, the channel state, etc. The channel state may be represented by at least one of information such as a signal to noise ratio (SNR), a signal to interference and noise ratio (SINR), a channel quality indicator (CQI), a quality of service (QoS), etc.

The transmission power calculator 420 calculates the transmission power based on the estimated radio environment (S220).

The power controller 430 of the base station 400 controls the power of the base station based on the calculated transmission power (S230). The power controller 430 transmits the reference signal by the predetermined power. The power controller 430 allows the base station 400 to transmit a general signal other than the reference signal at the transmission power calculated at step S220.

A reference signal generator 441 in the signal generator 440 of the base station 400 generates a reference signal that is used to estimate the radio environment of the neighbor base stations, a general signal generator 442 generates a general signal other than the reference signal, and the signal amplifier 450 amplifies the general signal at the transmission power that corresponds to the control of the power controller 430 (S240). The general signal is a control signal or a data signal between the base station 400 and the terminal in the cell.

Therefore, the base station can control the transmission power based on the radio environment in addition to the positional relationship of the neighbor base stations and can efficiently control the cell coverage. The above-mentioned transmission power control process can be periodically or aperiodically repeated according to a change in position of the base station. Alternatively, the transmission power control may be persistent, semi-persistent, or event-triggered.

Referring to FIG. 8, the transmission power calculator 420 of the base station 400 obtains a correlation value between the reference signal transmitted from the neighbor base station and the reference signal received from the neighbor base station (S300).

The transmission power calculator 420 of the base station 400 compares the correlation value with the predetermined threshold value (S310). The threshold value may be cell common or cell specific, and can be used to determine whether there is an active base station that has an effect on the base station 400 above a predetermined level. For example, the base station can determine that there is the active base station if the correlation value is larger than the threshold value and that there is no active base station if the correlation value is smaller than the threshold value.

If it is determined that there is an active base station, the transmission power calculator 420 of the base station 400 stores the receiving power of the reference signal received from the active base station in the receiving power table (S320). Step S300 to step S320 may progress for each neighbor base station. If it is determined that there is no active base station, the base station can be operated as an independent cell.

The transmission power calculator 420 of the base station 400 determines the transmission power of the reference signal that is stored in the table (S330).

Generally, Equation 1 is established between the transmission power and the receiving power.

$$P_t[dB]=P_r-PL+AG_t+AG_r \qquad \text{(Equation 1)}$$

Herein, $P_t$ is transmission power, $P_r$ is receiving power, PL is path loss, $AG_t$ is transmitting antenna gain, and $AG_r$ is receiving antenna gain. The path loss may be represented by a function of a height of the transmitting antenna and the receiving antenna, a distance between the transmitting base station and the receiving base station, and a frequency.

According to Equation 1, the transmission power calculator 420 calculates the path loss (PL) between the base stations to determine the transmission power (S331).

Generally, the path loss between the base station and the terminal in a city may be represented by the following Equation 2 according to a cost model.

$$PL[dB] = (44.9 - 6.55\log_{10}(h_{bg}))\log_{10}\left(\frac{d}{1000}\right) + 45.5 + \qquad \text{(Equation 2)}$$
$$(35.46 - 1.1h_{ms})\log_{10}(f_c) - 13.82\log_{10}(h_{bs}) + 0.7h_{ms} + C$$

Herein, $h_{bs}$ is a height of the base station, $h_{ms}$ is a height of a terminal, d is a distance between the base station and the terminal, and f is a central frequency. C, which is a constant, is 3. For example, if $h_{bs}$=32 m, $h_{ms}$=1.5 m, and f=1900 MHz, Equation 2 may be represented by a function of a distance according to the following Equation 3.

$$PL(d)[dB]=31.5+35 \log_{10}(d) \qquad \text{(Equation 3)}$$

Equations 2 and 3 are applied between the terminal and the base station, but Equations 2 and 3 are modified into a form of using the neighbor base station instead of the terminal, such that they can be applied between the base stations.

Figure 9:
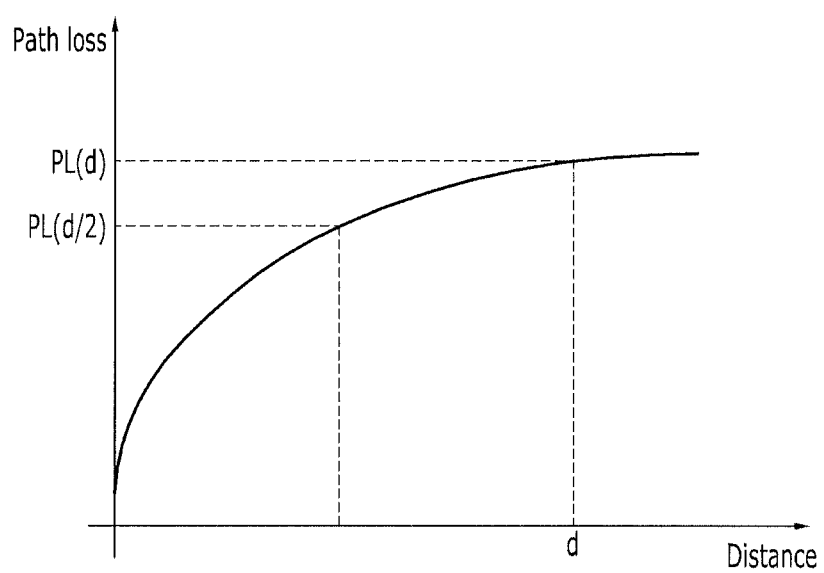
FIG. 9 is a graph showing a path loss according to a distance.

The path loss according to the distance of Equation 3 can be represented by a graph of FIG. 9. In FIG. 9, the horizontal axis represents a distance and the vertical axis represents a path loss. Most path losses have a form similar to the graph of FIG. 9. The equation representing the path loss may be differently represented according to the radio environment of the area in which the base station is installed. Therefore, the equation representing the path loss can be changed according to the position of the base station. Equation 3 can be appropriately changed according to accumulated experimental results and experience.

The following Equation 4 is another equation that represents the path loss.

$$PL(d)=P_{t,r}-P_{r,r}+AG_t+AG_r \qquad \text{(Equation 4)}$$

Herein, $P_{t,r}$ is the transmission power of the reference signal and $P_{r,r}$ is the receiving power of the reference signal. Since the transmission power of the reference signal is previously set to be the same between the plurality of base stations, and the transmitting antenna gain and the receiving antenna gain are already known, the path loss of the reference signal can be determined from Equation 4.

The transmission power calculator 420 of the base station 400 estimates the distance between the base stations by using the measured path loss (S332). The distance between the base stations can be estimated by substituting it into the graph of FIG. 9.

The transmission power calculator 420 of the base station 400 controls the cell coverage by using the estimated distance between the base stations (S333), and determines the transmission power so that the transmission power becomes the receiving power having a desired magnitude at the cell boundary (S334). The following Equation 5 determines the transmission power so that the transmission power becomes the receiving power having a desired magnitude at a middle point between two base stations.

$$P_{t,k}=P_{ce}+PL(d/2)-(AG_t-AG_r) \qquad \text{(Equation 5)}$$

Herein, $P_{t,k}$ is the transmission power of the k-th base station, $P_{ce}$ is the magnitude of the desired receiving power at the cell boundary, and PL(d/2) is the path loss at a middle point between two base stations. PL (d/2) can be estimated by using the graph of FIG. 9.

When a point nearer any one base station than the middle point between two base stations is considered as the cell boundary, the following equation can be used.

$$P_{t,k}=P_{ce}+PL(d_x)-(AG_t+AG_r) \qquad \text{(Equation 6)}$$

Herein, $P_{t,k}$ is the transmission power of the k-th base station, $P_{ce}$ is the magnitude of the desired receiving power at the cell boundary, and PL($d_x$) is the path loss at a distance corresponding to x(0<x<1) times the distance between the base stations. PL($d_x$) can be estimated by using the graph of FIG. 9.

When the plurality of active base stations exist around any base station, the transmission power for determining the cell coverage can be calculated based on at least one of the plurality of active base stations. For example, an active base station where the receiving power of the reference signal is minimum may be a reference, or an active base station where the receiving power of the reference signal is maximum may be a reference. Alternatively, the average value of the receiving power of the plurality of reference signals stored in the table may be a reference.

Next, a method for transmitting the reference signal will be described in detail with reference to FIGS. 10 and 11.

Figure 10:
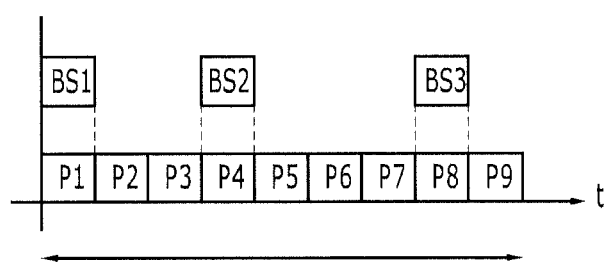
FIG. 10 is a diagram showing a period for transmitting the reference signal according to an exemplary embodiment of the present invention.
Figure 11:
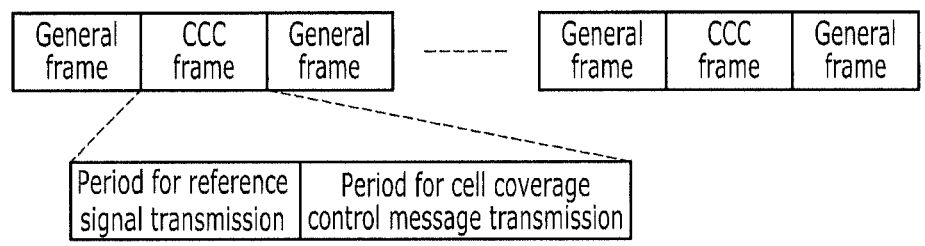
FIG. 11 is a diagram showing a frame structure in which a period for transmitting the reference signal according to an exemplary embodiment of the present invention is inserted.

FIG. 10 is a diagram showing a period for transmitting the reference signal according to an exemplary embodiment of the present invention, and FIG. 11 is a diagram showing a frame structure in which a period for transmitting the reference signal according to an exemplary embodiment of the present invention is inserted.

In order to identify the reference signal transmitted from each base station, the same resource should not be allocated between base stations within a predetermined range. The resource for transmitting the reference signal may be previously allocated to each base station.

Referring to FIG. 10, some time resources P1, P4, and P8 of the entire time resources P1, P2, P3, P4, P5, P6, P7, P8, and P9 for transmitting the reference signal are used by three base stations BS1, BS2, and BS3. For example, the time resource P1 is used for transmitting the reference signal of the base station BS1, the time resource P4 is used for transmitting the reference signal of the base station BS2, and the time resource P8 is used for transmitting the reference signal of the base station BS3. Therefore, a new base station selects some time resources of the remaining time resources P2, P3, P5, P6, P7, and P9, thereby making it possible to transmit the reference signal.

Although FIG. 10 illustrates the period allocation for transmitting the reference signal based on the time resource, it is not limited thereto. A period for transmitting the reference signal can be allocated by using the time resource as well as the frequency resource and the code resource. In addition, a period for transmitting the reference signal can be allocated by combining at least two of the time resource, the frequency resource, and the code resource.

Referring to FIG. 11, the cell coverage control frame (CCC frame) is periodically and aperiodically inserted between the general frames. The general frame may be one unit of a superframe, a radioframe, a frame, a subframe, and a slot. The general frame is an area where the general control signal and the data signal between the base station and the terminal are transmitted.

The CCC frame includes a period for transmitting the reference signal and a period for transmitting the cell coverage control message. The period for transmitting the reference signal may be a period shown in FIG. 10, as an example. Each base station transmits the reference signal to the neighbor base station through the period for transmitting the reference signal in the CCC frame, or receives the reference signal from the neighbor base station. Some of the periods for transmitting the reference signal are allocated to each base station. Each base station transmits and receives a necessary message to and from the cell coverage control through the period for transmitting the cell coverage control message in the CCC frame.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling transmission power of a base station in a cellular system, comprising:
   receiving a reference signal having a predetermined transmission power from at least one neighbor base station;
   estimating a radio environment between the base station and the neighbor base station by using the reference signal; and
   controlling a cell coverage of the base station to correspond with transmission power calculated based on the estimated radio environment, and
   wherein the estimating the radio environment comprises:
      obtaining a path loss between the base station and the neighbor base station from the receiving power of the reference signal; and
      estimating a distance between the base station and the neighbor base station from the path loss, and
   the controlling the cell coverage comprises:
      determining the transmission power using a correlation value between the reference signal transmitted from the neighbor base station and the reference signal received from the neighbor base station and setting the transmission power as a receiving power having a desired magnitude at a boundary of the controlled cell coverage in accordance with comparison of the correlation value with a threshold, where the cell coverage is variably set in accordance with the determining.

2. The method of claim 1, wherein
the radio environment includes a distance between the base station and the neighbor base station.

3. The method of claim 1, wherein
the reference signal is allocated to different radio resources for each base station.

4. The method of claim 3, wherein
the radio resources are at least one of a time resource, a frequency resource, and a code resource.

5. The method of claim 1, wherein
the reference signal includes an indicator to identify the base station.

6. The method of claim 1, wherein
the reference signal transmitted by the base station and the reference signal transmitted by the neighbor base station are transmitted at power having the same magnitude.

7. The method of claim 1, further comprising
obtaining a correlation value between the reference signal transmitted by the base station and the reference signal received from the neighbor base station and comparing the correlation value with a predetermined threshold value to determine whether there is a neighbor base station.

8. A base station, comprising:
a reference signal receiver that receives a reference signal from a neighbor base station;
a transmission power calculator that calculates transmission power by using the received reference signal; and
a power controller that transmits the reference signal to the neighbor base station at predetermined power and transmits a signal to an user equipment in a cell formed to correspond with the transmission power calculated in the transmission power calculator, and
wherein the transmission power calculator calculates the transmission power by estimating a distance between the base station and the neighbor base station by using a path loss between the base station and the neighbor base station, and determining the transmission power using a correlation value between the reference signal transmitted from the neighbor base station and the reference signal received from the neighbor base station, and
the transmission power is set as a receiving power having a desired magnitude at a boundary of the cell coverage in accordance with comparison of the correlation value with a threshold, and
the cell coverage is variably set in accordance with the determining.

9. The base station of claim 8, wherein the reference signal receiver directly receives the reference signal or receives the reference signal through a receiving apparatus connected to the base station.

* * * * *